United States Patent
Powell

(10) Patent No.: US 6,663,330 B2
(45) Date of Patent: Dec. 16, 2003

(54) ROLL PIN COMPRESSION LIMITER

(75) Inventor: Jeff Powell, Windsor (CA)

(73) Assignee: Siemens VDO Automotive, Inc., Chatham (CA)

( * ) Notice: Subject to any disclaimer, the term of this patent is extended or adjusted under 35 U.S.C. 154(b) by 0 days.

(21) Appl. No.: 10/056,599

(22) Filed: Jan. 25, 2002

(65) Prior Publication Data

US 2002/0062807 A1 May 30, 2002

Related U.S. Application Data

(62) Division of application No. 09/788,829, filed on Feb. 20, 2001.
(60) Provisional application No. 60/215,890, filed on Jul. 5, 2000.

(51) Int. Cl.$^7$ ............................................... F16B 43/02
(52) U.S. Cl. ........................ 411/546; 411/61; 411/383; 411/544
(58) Field of Search ........................... 411/61, 173, 176, 411/383, 384, 546, 544, 547

(56) References Cited

U.S. PATENT DOCUMENTS

| 3,687,496 A | * | 8/1972 | Hindin ................... 411/546 X |
| 4,867,461 A | | 9/1989 | Shimmell |
| 5,071,299 A | * | 12/1991 | Sekine et al. ........... 411/176 X |
| 5,094,563 A | * | 3/1992 | Carletti ................... 411/546 X |
| 5,513,603 A | | 5/1996 | Ang et al. |
| 5,704,752 A | * | 1/1998 | Logerot .................... 411/61 X |
| 5,711,711 A | | 1/1998 | Schmidt, Jr. |
| 5,807,052 A | | 9/1998 | Van Boven et al. |
| 6,079,922 A | * | 6/2000 | Ross et al. ................ 411/61 X |

FOREIGN PATENT DOCUMENTS

| DE | 29709250 | | 8/1997 | |
| EP | 0936363 | | 8/1999 | |
| EP | 0942164 | | 9/1999 | |
| FR | 2315012 | | 1/1977 | |
| GB | 1407550 | * | 9/1975 | ................ 411/61 |
| GB | 2216974 | | 10/1989 | |

* cited by examiner

Primary Examiner—Neill Wilson

(57) ABSTRACT

A compression limiter formed by a roll forming process includes a substantially cylindrical body portion and a plurality of feet. A plurality of notches are stamped along a lower edge of a flat sheet of stock and bent to form the plurality of feet. The flat sheet of stock is then rolled to form the compression limiter. In the preferred embodiment, the compression limiter is formed of a high carbon steel. The plurality of feet of the compression limiter transmit the bolt load of a fastener attaching a plastic intake manifold to a component. In an alternative embodiment, an angled portion attaches each foot to the body of the compression limiter which accommodates for variations in the height of the plastic intake manifold.

7 Claims, 4 Drawing Sheets

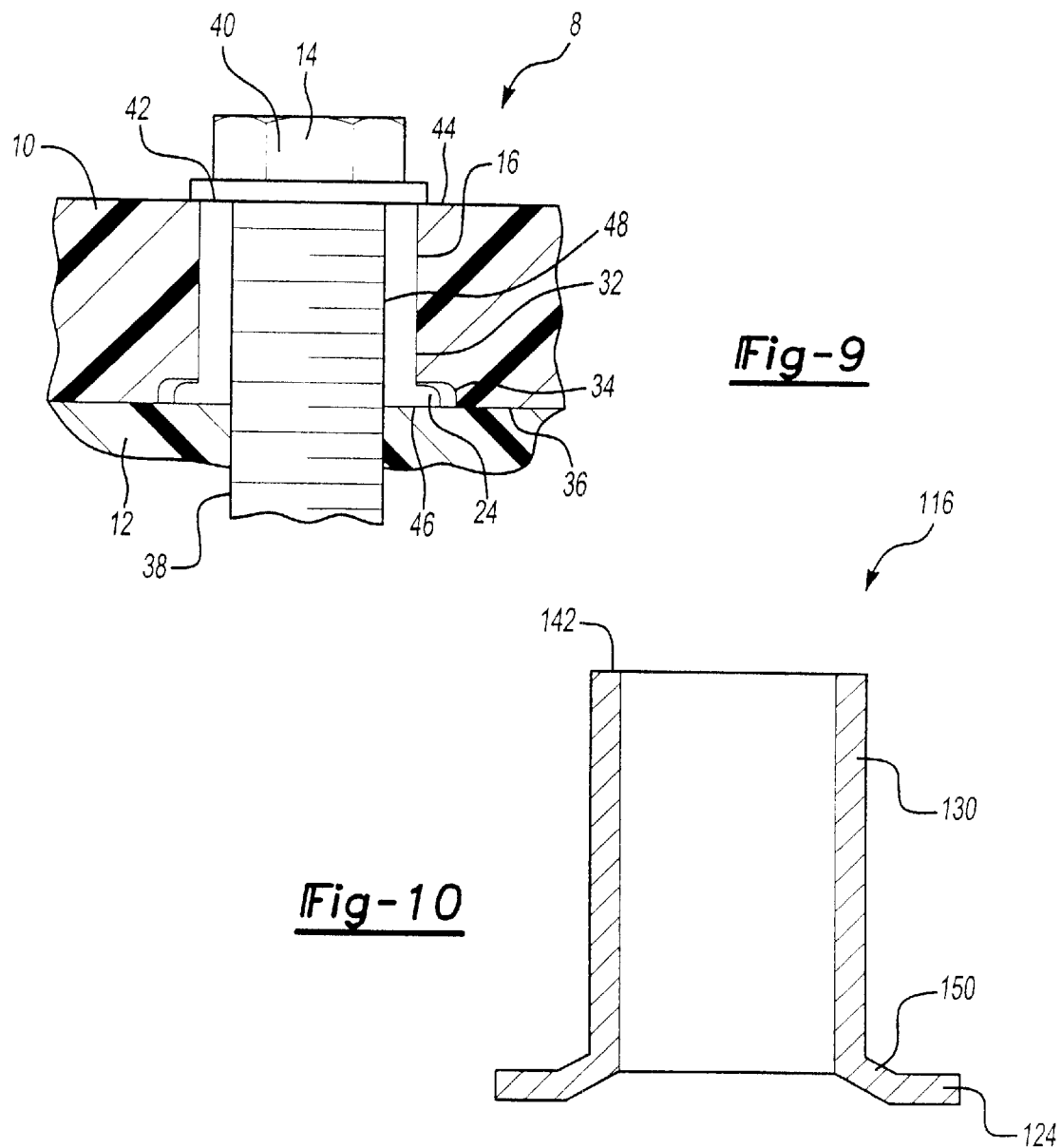

ROLL PIN COMPRESSION LIMITER

This application is a divisional application of Ser. No. 09/788,829 filed Feb. 20, 2001.

This application claims priority from provisional application Ser. No. 60/215,890 filed Jul. 5, 2000.

BACKGROUND OF THE INVENTION

The present invention relates generally to an improved compression limiter utilized to transmit loads in an intake manifold assembly.

In an intake manifold assembly, fasteners are utilized to secure a plastic intake manifold to a component. The bolt load applied to the plastic intake manifold is reduced over time due to a condition known as material creep. Compression limiters are commonly employed to transmit the bolt load to the component and minimize plastic material creep.

In the prior art, metal compression limiters are inserted into a bore in the plastic intake manifold which receives the fastener, transmitting the bolt load to the component. However, the contact surface area of the compression limiter and the component is relatively small. Therefore, the compression limiters can press into and deform the material of the component over time, reducing the applied bolt load at the location of contact.

Hence, there is a need in the art for an improved compression limiter utilized to transmit loads in an intake manifold assembly.

SUMMARY OF THE INVENTION

The present invention relates generally to an improved compression limiter utilized to transmit loads in an intake manifold assembly.

The compression limiter of the present invention includes a substantially cylindrical body portion and a plurality of feet. The compression limiter is formed by a roll forming process. A plurality of notches are stamped along a lower edge of a flat sheet of stock. The notches are then bent to form a plurality of feet. The flat sheet of stock is then rolled to form a substantially cylindrical compression limiter. In the preferred embodiment, the compression limiter is formed of a high carbon steel.

Once installed, plurality of feet of the compression limiter bears the bolt load of a fastener which attaches a plastic intake manifold to a component. The compression limiter is interference fit within the plastic intake manifold and the plurality of feet are received within a foot bore in the plastic intake manifold and the component. When the fastener is installed, the head of the fastener contacts and bears down against the compression limiter, and the plurality of feet contact and transmit the bolt load to the component.

In an alternative embodiment, an angled portion attaches each foot to the body of the compression limiter. The angled portion accommodates for variations in the height of the plastic intake manifold and accounts for the height variations by reducing the height of the compression limiter.

Accordingly, the present invention provides an improved compression limiter utilized to transmit loads in an intake manifold assembly.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 9 illustrates cross-sectional side view of the compression limiter of the present invention installed in an assembly.

FIG. 10 illustrates an alternative embodiment of the compression limiter.

DETAILED DESCRIPTION OF THE PREFERRED EMBODIMENT

Figure 1:
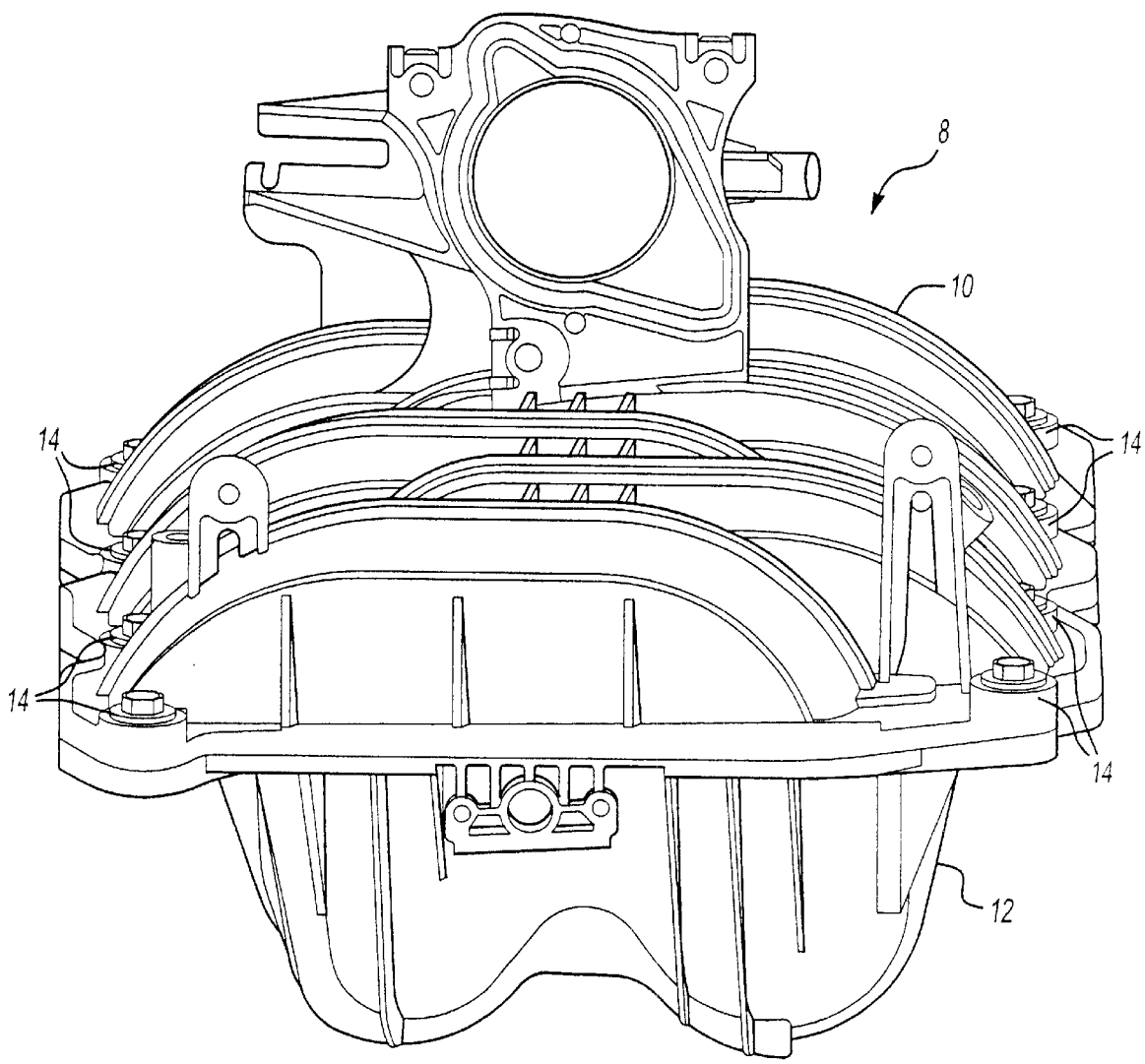
FIG. 1 illustrates a plastic intake manifold fastened to a component by a plurality of bolts.
Figure 2:
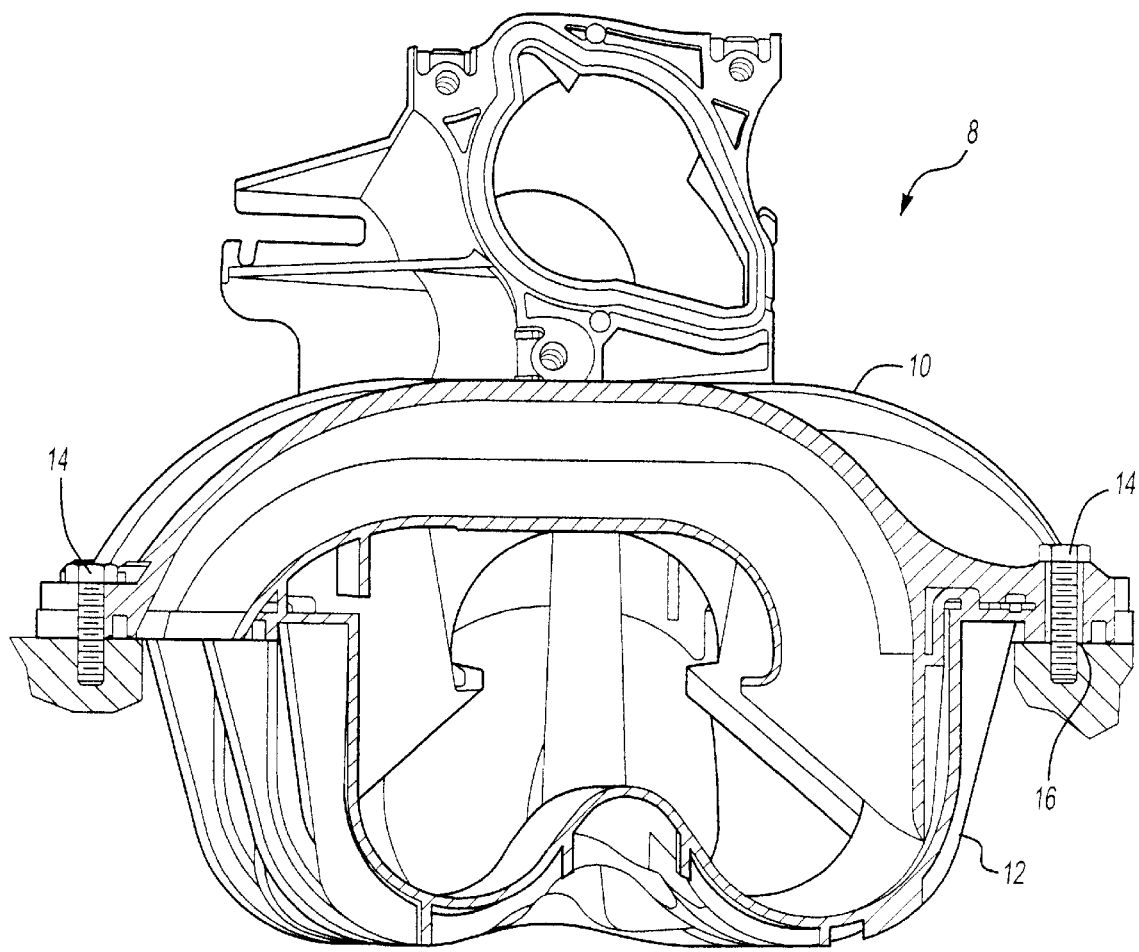
FIG. 2 illustrates a cross sectional view of FIG. 1.

FIG. 1 illustrates an intake manifold assembly 8 including a plastic intake manifold 10 secured to a component 12, such as an engine, by a plurality of fasteners 14. As illustrated in FIG. 2, a compression limiter 16 is commonly utilized on a plastic intake manifold 10 to transmit bolt load to the component 12 in the areas where the fasteners 14 are located.

Figure 3:
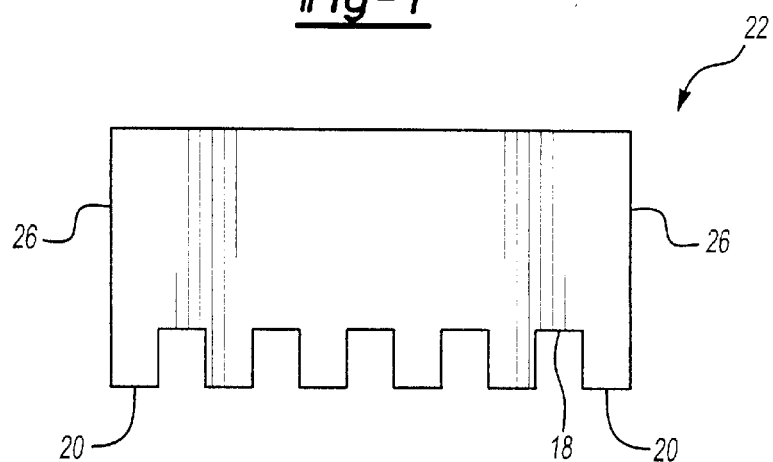
FIG. 3 illustrates a front view of the formation of notches on the sheet stock utilized to form the compression limiter of the present invention.

The compression limiter 16 of the present invention is formed of by a roll forming process. In the preferred embodiment, the compression limiter 16 is formed of a high carbon steel. As illustrated in FIG. 3, a plurality of notches 18 are stamped along the lower edge 20 of a substantially flat sheet of stock 22. In the preferred embodiment, the notches 18 are substantially rectangular in shape.

Figure 4:
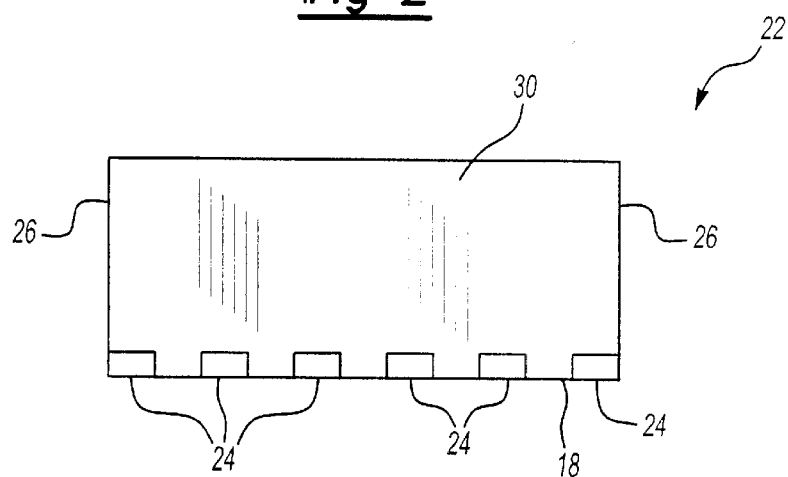
FIG. 4 illustrates a front view of the formation of feet on the sheet stock utilized to form the compression limiter of the present invention.
Figure 5:
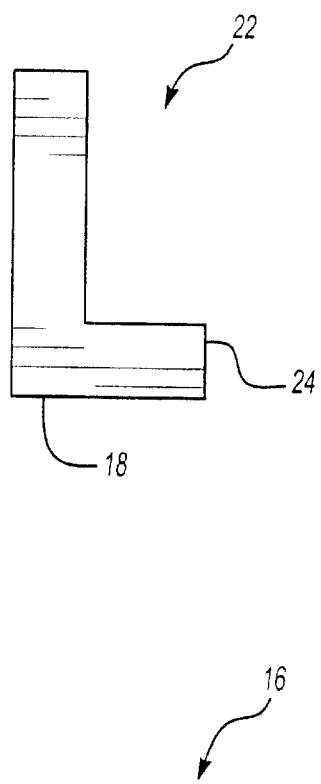
FIG. 5 illustrates a side view of the sheet stock illustrated in FIG. 4.

As illustrated in FIGS. 4 and 5, the notches 18 are bent to form a plurality of feet 24. It is preferred that the notches 18 are bent 90° to the sheet stock 22. Once installed, the plurality of feet 24 transmit the bolt load of the fastener 14 to the component 12.

Figure 6:
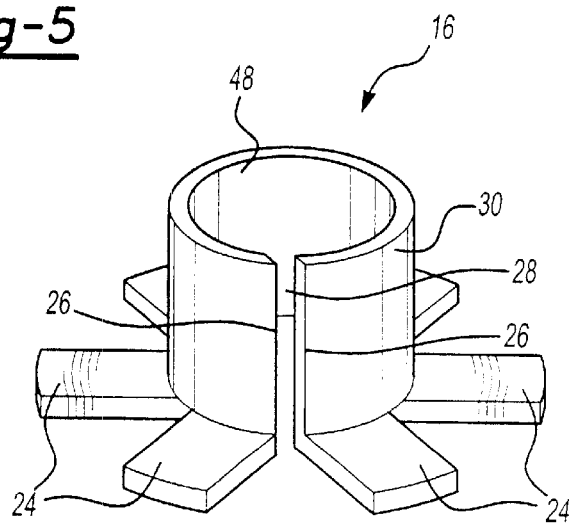
FIG. 6 illustrates a perspective view of the compression limiter of the present invention.
Figure 7:
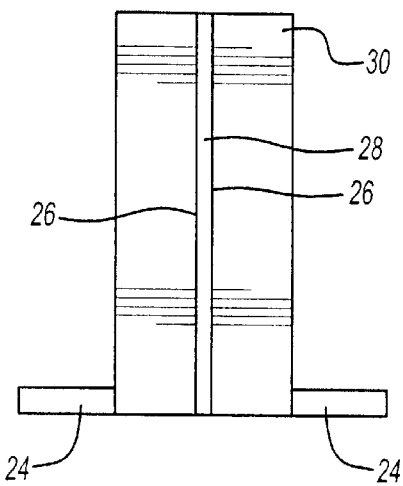
FIG. 7 illustrates a side view of the compression limiter of the present invention.
Figure 8:
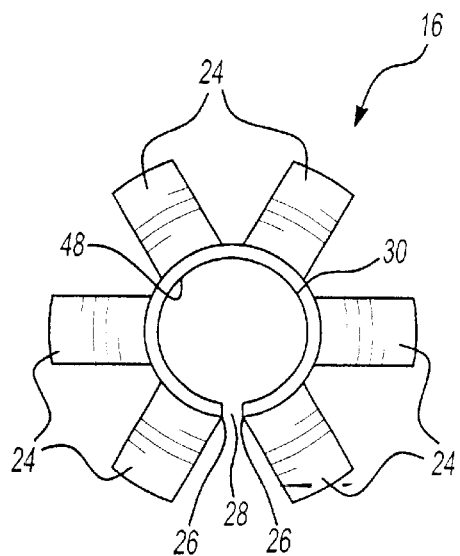
FIG. 8 illustrates a top view of the compression limiter of the present invention.

The sheet stock 22 is then rolled to form the compression limiter 16 of the present invention as illustrated in FIGS. 6–8. The body 30 of the sheet stock 22 is rolled to form the substantially cylindrical compression limiter 16. When rolled, the side edges 26 of the compression limiter 16 do not substantially contact, forming a gap 28 between the side edges 26. The compression limiter 16 includes a limiter bore 48 of diameter sufficient to receive the fastener 14.

FIG. 9 illustrates the compression limiter 16 installed in the intake manifold assembly 8. The plastic intake manifold 10 includes a bore 32 of sufficient diameter to receive the compression limiter 16. The plastic intake manifold 10 further includes a foot portion 34 located at the mating surface 36 of the plastic intake manifold 10 and the component 12 and centrally aligned with the bore 32. The foot portion 34 is of larger diameter than the bore 32 and receives the plurality of feet 24 of the compression limiter 16. The compression limiter 16 is interference fit within the bore 32 of the plastic intake manifold 10.

The component 12 includes a component bore 38 which is substantially aligned with the limiter bore 48 of the plastic intake manifold 12. The component bore 38 is of sufficient diameter to receive the fastener 14. The aligned bores 38 and 48 receive the fastener 14, securing the plastic intake manifold 10 to the component 12. When the fastener 14 is installed, the head 40 of the fastener 14 contacts and bears down against the upper surface 42 of the compression limiter 16 and the upper surface 44 of the plastic intake manifold 10. As the fastener 14 applies pressure to the compression limiter 16, the plurality of feet 24 contact the contact surface 46 of the component 12, transmitting the bolt load to the component 12.

FIG. 10 illustrates an alternative compression limiter 116. In this embodiment, an angled portion 150 attaches each foot 124 to the body 130 of the compression limiter 116. This embodiment is otherwise formed similar to the earlier embodiment. If there is a diameter variation between the bore of the plastic intake manifold and the compression limiter 116, the angled portion 150 accommodates for variations in the height of the plastic intake manifold. As the fastener secures the plastic intake manifold to the component, the fastener contacts and presses downwardly on the upper surface 142 of the compression limiter 116. The flexible angled portions 150 account for height variations by reducing the height of the compression limiter 116 as the bolt load is applied.

There are several advantages to utilizing the compression limiter 16, 116 of the present invention. For one, the plurality of feet 24 of the compression limiter 16 transmit the bolt load of the fastener 14 to the component 12. By employing a plurality of feet 24, the surface area of the compression limiter 16 contacting the component 12 is increased. This reduces the likelihood of the compression limiter 16 pressing into and deforming the material of the component and reducing the bolt load applied to the component.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A compression limiter comprising:

a body portion having an outer surface and a generally cylindrical outer periphery defining an outer diameter, an upper end and a lower end; and a plurality of protrusions extending from said lower end of said body portion, and said plurality of protrusions to apply a load to a component when a force is applied to said upper end of said body portion.

2. The compression limiter as recited in claim 1 wherein said compression limiter is formed of a high carbon steel.

3. The compression limiter as recited in claim 1 wherein said body portion of said compression limiter is substantially cylindrical and an inner surface of said body portion forms a limiter bore.

4. The compression limiter as recited in claim 1 wherein said outer diameter does not vary.

5. A compression limiter comprising:

a body portion having an upper end and a lower end;

a plurality of protrusions extending from said lower end of said body portion to apply a load to a component when a force is applied to said upper end of said body portion, wherein each of said plurality of protrusions of said compression limiter further includes an angled portion located between said body portion and each of said plurality of feet.

6. A compression limiter comprising:

a body portion having an outer surface and a generally cylindrical outer periphery defining an outer diameter, an upper end and a lower end; and a plurality of protrusions extending 90° from said lower end of said body portion to apply a load to a component when a force is applied to said upper end of said body portion.

7. A compression limiter comprising:

a substantially cylindrical body portion having an outer surface and a generally cylindrical outer periphery defining an outer diameter, an inner surface defining a limiter bore, an upper end and a lower end;

a plurality of protrusions extending from said lower end of said body portion to apply a load to a component when a force is applied to said upper end of said body portion; and a fastener inserted within said limiter bore of said compression limiter that applies force to said upper end of said body portion of said compression limiter.

* * * * *